United States Patent [19]

Solomon et al.

[11] Patent Number: 4,816,646
[45] Date of Patent: Mar. 28, 1989

[54] FOOD DELIVERY HOT BAG WITH ELECTRIC HOT PLATE

[75] Inventors: Harold D. Solomon, Brighton; Wayne R. Greve, Canton, both of Mich.

[73] Assignee: Domino's Pizza, Inc., Ann Arbor, Mich.

[21] Appl. No.: 170,903

[22] Filed: Mar. 21, 1988

[51] Int. Cl.⁴ ............................................. H05B 3/28
[52] U.S. Cl. .................................. 219/387; 219/521; 219/202; 219/462
[58] Field of Search ............... 219/385, 386, 387, 521, 219/202, 439, 462

[56] References Cited

U.S. PATENT DOCUMENTS

| | | | |
|---|---|---|---|
| 1,377,092 | 5/1921 | Phaneuf | 219/387 |
| 1,683,889 | 9/1928 | Hayne | 219/387 |
| 2,577,870 | 12/1951 | Aston | 219/387 |
| 3,051,582 | 8/1962 | Muckler | 219/386 |
| 3,521,030 | 7/1970 | Maahs | 219/386 |
| 3,608,627 | 9/1971 | Shevlin | 219/386 |
| 3,721,803 | 3/1973 | DiStefano | 219/387 |
| 3,746,837 | 7/1973 | Frey et al. | 219/387 |
| 4,134,004 | 1/1979 | Anderson et al. | 219/387 |
| 4,578,814 | 3/1986 | Skamser | 219/386 |

FOREIGN PATENT DOCUMENTS

| | | | |
|---|---|---|---|
| 2521408 | 8/1983 | France | 219/385 |
| 2056264 | 3/1981 | United Kingdom | 219/387 |

Primary Examiner—Teresa J. Walberg
Attorney, Agent, or Firm—Beaman & Beaman

[57] ABSTRACT

A receptacle for delivering food in a hot condition in the form of a bag formed of insulating material having a closure defined at an end. Within the bag an insert of a high density material capable of retaining heat is located and is heated by an electric resistance heater. Prior to use, the insert mass is heated to the desired temperature and food, such as pizza, placed within the bag will stay warm due to the heat retention of the mass. A plurality of bags are stored in a heated condition so as to be ready for use as needed.

4 Claims, 1 Drawing Sheet

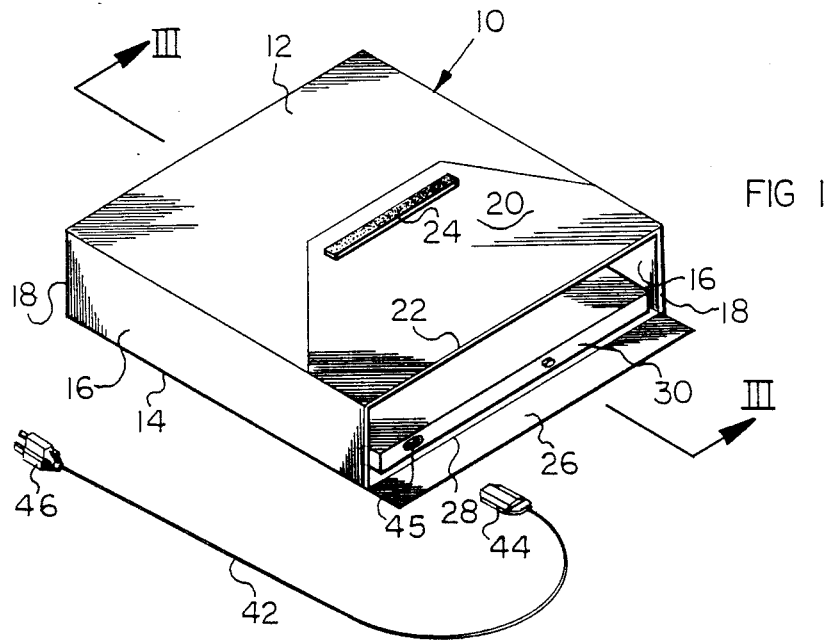
FIG 1
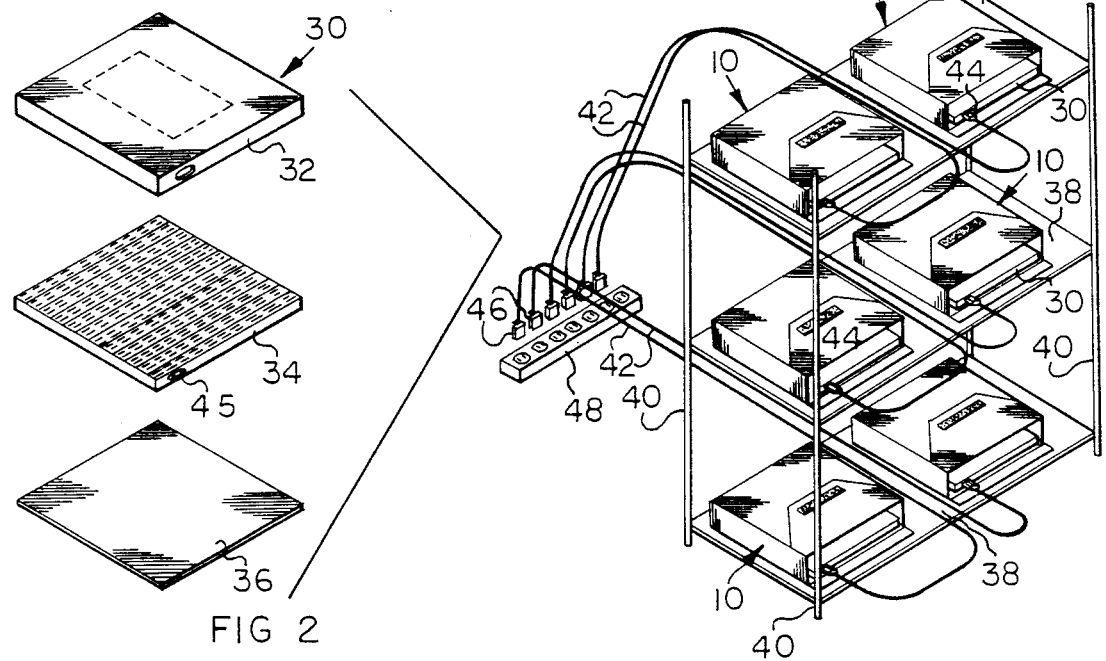
FIG 2
FIG 4
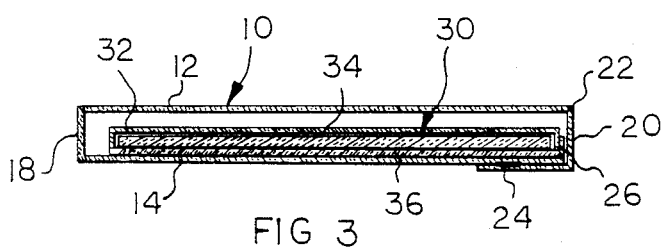
FIG 3

FOOD DELIVERY HOT BAG WITH ELECTRIC HOT PLATE

BACKGROUND OF THE INVENTION

A major problem in the delivery of hot food baked at a store and delivered to a home by store employees, such as pizza, lies in the maintaining of the food at an elevated high temperature during delivery. In northern climates during the winter, the difference in temperatures between the food being delivered and the environmental air may be considerable, and significant heat loss must be prevented if the food is to arrive to the consumer at an acceptable temperature.

In the home delivery of pizza it is conventional to utilize a receptacle or bag formed of thermal insulating material into which the box containing the freshly baked pizza is placed. The driver delivers the pizza to the customer as quickly as possible so that the customer receives the food at a temperature as close to the baking temperature as possible.

Various transport carriers and containers have been proposed to meet the aforedescribed problem and proposed solutions are found in U.S. Pat. Nos. 1,683,889; 3,721,803; 3,746,837 and 4,134,004. While these devices do make progress toward solving the basic problem of maintaining the food hot, they have not been practical due to expense and operating shortcomings.

It is an object of the invention to provide a food carrying receptacle particularly suitable for the home delivery of pizza which is of an economical manufacture, highly portable, and capable of maintaining the pizza at the desired temperature during the delivery.

Another object of the invention is to provide a heated food carrier of such construction as to maintain a freshly baked and boxed pizza at the desired temperature without overcooking or otherwise damaging the pizza.

A further object of the invention is to provide a system for keeping a plurality of hot food carriers for use and wherein unusual skills are not required to utilize the inventive concepts.

In the practice of the invention a rectangular receptacle of a size slightly larger than that of a pizza box is formed of thermal insulating material. One end of the receptacle includes a closure flap to permit the interior of the receptacle to be closed, and internally, an insert is located within the receptacle which consists of a high density heat retaining mass, an electric resistance heater, and a thermal pad upon which the insert rests when placed within the receptacle.

The heatable insert includes an electrical connection fitting wherein an electric power source may be connected to the insert when the receptacle and insert are located upon shelves awaiting use.

A plurality of receptacles in accord with the invention are located on shelves and the resistance heaters of the inserts are each connected to an electric power source by a flexible conductor wherein the inserts will be heated to the desired temperature, approximately 200° .F, and maintained at such temperature until use during delivery. Upon it being desired to use the receptacle the conductor is quickly disconnected from the heating element, the pizza box placed within the receptacle upon the insert, the receptacle closure flap is closed, and the direct support of the pizza box upon the insert will maintain the box and its contents at the desired temperature.

BRIEF DESCRIPTION OF THE DRAWINGS

The aforementioned objects and advantages of the invention will be appreciated from the following description and accompanying drawing wherein:

FIG. 1 is a perspective view of a food carrying receptacle in accord with the invention, the closure flap being in an open position, and the electrical conductor is illustrated in a non-connected condition, FIG. 2 is a perspective exploded view of the insert and its components, FIG. 3 is an elevational sectional view as taken along Section III—III of FIG. 1 illustrating the closure flap in a closed condition, and FIG. 4 is a perspective view illustrating a plurality of receptacles mounted upon shelves and in a "ready" condition.

DESCRIPTION OF THE PREFERRED EMBODIMENT

The food carrier basically consists of a receptacle generally indicated at 10 of a rectangular configuration. The receptacle is preferably formed of a flexible fabric type material which is thermally insulated and may consist of several layers sewed together having an insulating material therebetween. However, it is to be appreciated that the receptacle 10 could be formed of a rigid material and the particular type of material forming the receptacle is not critical to the inventive aspects.

The receptacle 10 includes a top 12, a bottom 14, spaced parallel sides 16 and ends 18. A closure flap 20 formed of the bag material is hinged to an open end 18 at 22 and the closure flap 20 includes a fastener strip 24 such as that sold under the trademark Velcro. A bottom flap 26 is hinged to the bottom 14 at 28 and is also formed of the material of the receptacle. As will be appreciated from FIG. 3, the closure 20 will fold down over the open end 18 to enclose the end and the Velcro 24 will cooperate with a complementary fastening strip mounted upon the exterior of the bottom 14. Prior to the closure 20 being hinged about hinge 22 the lower flap 26 will be hinged upwardly so that the components form the relationship shown in FIG. 3 when the closure flap is closed.

An insert 30 is located within the receptacle cavity and may be readily inserted in or removed from the receptacle interior. The insert 30 includes a rectangular high density mass 32 and the purpose of the mass 32 is to retain the heat absorbed from the heating grid 34. The mass 32 may be of metal, or a high density ceramic or other synthetic material, which is capable of extended heat retention.

The heater 34 is directly associated with the mass 32 and may be received within a cavity defined within the mass. The heater 34 includes conventional electrical resistance heating wire or coils, or the like, wherein the heater 34 will attain a desired temperature when connected to an electrical source.

A thermal pad 36 is attached to the underside of the heater 34 to protect the heat of the insert from damaging the interior of the receptacle bottom 14.

When the insert 30 is located within the cavity of the receptacle 10 the components will be related as apparent from FIGS. 1 and 3.

The system of utilizing the receptacle 10 includes the apparatus shown in FIG. 4 which consists of a plurality of shelves 38 mounted upon columns 40. A plurality of the receptacles 10 are mounted upon the shelves 38 as illustrated, the closure flaps 20 being in the open condition.

A plurality of flexible electrical conductors 42 include a connector 44 at one end and a connector 46 at the other. The insert 30, and in particular the heater 34, includes a connector 45 into which the connector 44 may be readily inserted or removed therefrom. The connectors 46 are plugged into an electrical source 48 which may consist of a plurality of receptacles capable of receiving the connectors 46.

In use, a plurality of receptacles 10 are located upon the shelves 38 and the inserts of the receptacles are connected to the electrical source 48. The inserts 30 will be heated by the heaters 34 to approximately 200° F. and will be maintained at this temperature awaiting use.

Upon a pizza requiring delivery, the boxed pizza is placed within the cavity of a receptacle 10, the associated connector 44 is disconnected from the heater connector 45, the flap 26 pivoted upwardly and the flap 20 pivoted downwardly to close the end of the receptacle 10 as shown in FIG. 3, and the enclosed pizza box is transported to the customer within the receptacle 10. The use of the high density mass 32, and the location of the mass within the thermal material of the receptacle 10, permits the desired temperature to be maintained within the receptacle 10 and the pizza will be hot when delivered to the consumer.

It is appreciated that various modifications to the inventive concepts may be apparent to those skilled in the art without departing from the spirit and scope of the invention.

We claim:

1. A bag for maintaining freshly baked pizza hot while being delivered comprising, in combination, a thermally insulated rectangular receptacle having a top, a bottom, sides and ends, a closure defining one of said ends positionable between open and closed positions, an insert within said receptacle disposed adjacent said bottom, said insert comprising a high density material hving a rectangular configuration similar to the configuration of said receptacle and including a top and a bottom, a cavity defined in said material bottom, electric resistance heating means located within said cavity, thermal insulating means located between said electric resistance means and said receptacle bottom, and a connectable and disconnectable electric conductor coupling connected to said heating means.

2. In a bag as in claim 1, said high density material comprising a metallic mass.

3. In a bag as in claim 1, said high density material comprising a high density nonmetallic material.

4. A system for handling receptacles for delivery of hot, baked pizza comprising, in combination, a plurality of horizontal shelves, a plurality of pizza delivery bags mounted upon said shelves, each of said bags comprising a thermally insulated receptacle having a top, a bottom, sides and ends, a high density mass insert within each of said receptacles, electric resistance heating means incorporated into said insert for heating said insert mass, a plurality of flexible electric conductors each having a first end having a first electrical connector removably connected to one of said heating means and a second end connected to a source of electricity whereby said inserts and bags will be preheated while located upon said shelves and said bags may be individually and selectively removed from said shelves for receiving and delivering pizza upon disconnecting said first electrical connector from its associated heating means, and said preheated mass will maintain the pizza within said bags hot during delivery.

* * * * *